United States Patent [19]

Paladino

[11] 4,438,710
[45] Mar. 27, 1984

[54] SEEDLING PLANTER

[75] Inventor: Anthony Paladino, Woodstock, Canada

[73] Assignee: Timberland Equipment Limited, Woodstock, Canada

[21] Appl. No.: 361,253

[22] Filed: Mar. 24, 1982

[51] Int. Cl.$^3$ .............................................. A01C 11/02
[52] U.S. Cl. ...................................... 111/3; 172/398; 172/414; 172/478
[58] Field of Search ........................................ 111/1–3, 111/7, 52–59, 67, 68, 84; 172/322, 323, 327, 328, 395–398, 413, 414, 478

[56] References Cited

U.S. PATENT DOCUMENTS

| | | | |
|---|---|---|---|
| 2,691,930 | 10/1954 | Forgy | 172/328 |
| 2,719,498 | 10/1955 | Goolsby | 111/3 X |
| 3,145,671 | 8/1964 | Mosely | 111/3 |
| 3,931,774 | 1/1976 | Bradley | 111/3 |
| 4,067,268 | 1/1978 | Lofgren et al. | 111/2 |
| 4,069,774 | 1/1978 | Lofgren et al. | 111/3 |
| 4,082,048 | 4/1978 | Grundstrom et al. | 111/2 |
| 4,091,751 | 5/1978 | Dri | 111/2 |
| 4,112,857 | 9/1978 | Bradley | 111/3 |
| 4,116,137 | 9/1978 | Westerhoven | 111/2 |
| 4,169,419 | 10/1979 | Burgess | 111/2 |
| 4,177,743 | 12/1979 | Webster | 111/3 |
| 4,182,247 | 1/1980 | Talbott | 111/3 |
| 4,186,671 | 2/1980 | Huang | 111/2 |
| 4,273,056 | 6/1981 | Lofgren et al. | 111/2 |
| 4,371,039 | 2/1983 | Schaaf et al. | 172/398 X |

FOREIGN PATENT DOCUMENTS

| | | |
|---|---|---|
| 719886 | 10/1965 | Canada . |
| 796523 | 10/1968 | Canada . |
| 841950 | 5/1970 | Canada . |
| 1024828 | 1/1978 | Canada . |
| 1031630 | 5/1978 | Canada . |
| 1031631 | 5/1978 | Canada . |
| 1031632 | 5/1978 | Canada . |
| 1038236 | 9/1978 | Canada . |
| 1060719 | 8/1979 | Canada . |
| 1063880 | 10/1979 | Canada . |
| 1072824 | 3/1980 | Canada . |
| 1080553 | 7/1980 | Canada . |
| 1091100 | 12/1980 | Canada . |

Primary Examiner—James R. Feyrer

[57] ABSTRACT

A twin row seedling planter is provided with a new mechanical system for ejecting seedlings into a cut in the ground made by a dibble after the dibble has cut to a selected depth. The planter also features an improved modular lay-out of planting beams, packing beams and wheel support beams. The operators' station is located for ease of access to the planting dibbles. A simple and efficient system is used to raise and lower the packing beams and the planter frame in sequence.

14 Claims, 8 Drawing Figures

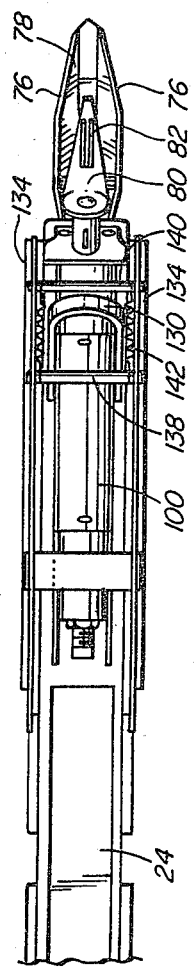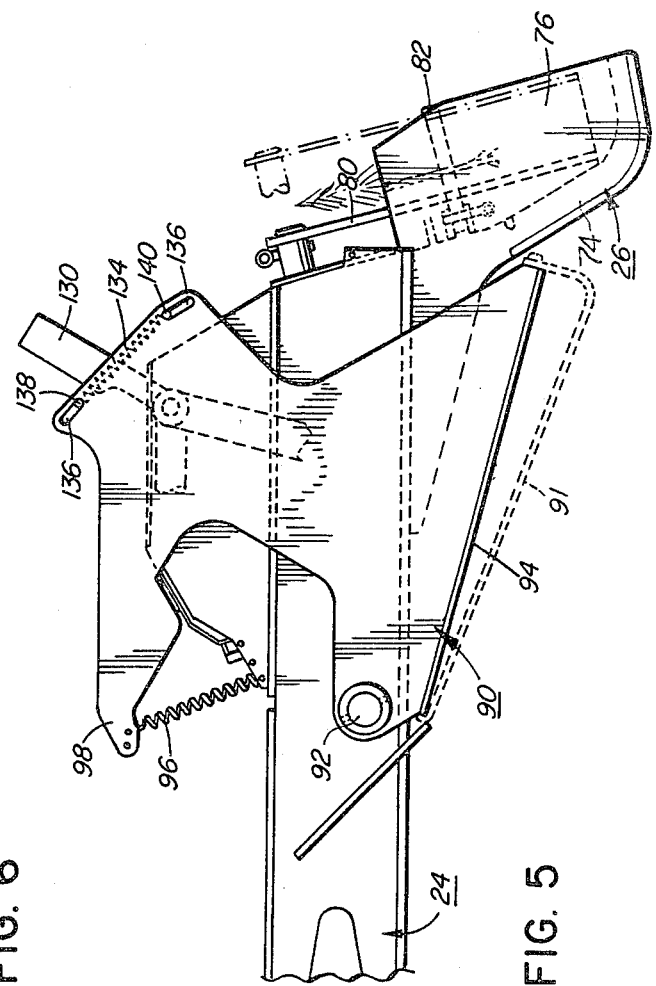
FIG. 6
FIG. 5

SEEDLING PLANTER

BACKGROUND OF THE INVENTION

This invention relates to improvements in apparatus for the planting of seedlings, particularly seedling trees.

Canadian Pat. No. 985,573 issued Mar. 16th, 1976 relates to a seedling planter apparatus which may be trailed behind a tractor or other towing vehicle and which may be operated by one man as during the course of a reforestation of other similar project. This apparatus includes a mobile frame adapted to travel over the ground with an arm being pivotally mounted to the frame and extending rearwardly from the mounting location. A dibble is carried by the free end of the arm which is adapted to cut into the ground when the arm is urged toward the ground by a hydraulic actuator during forward travel of the frame. A seedling planter is carried by the arm rearwardly of the dibble and is constructed to support a seedling for planting in the cut made by the dibble. A dislodging mechanism is provided for dislodging seedlings from the dibble into the cut. The apparatus includes a detection device for activating the dislodging means when the predetermined depth has been reached. In the event that the dibble fails to achieve the predetermined depth due to an obstacle such as a rock or boulder, the seedling dislodging device is not activated.

An improved apparatus for planting seedlings is described in U.S. application Ser. No. 269,506 filed June 1, 1981, the disclosure of the U.S. application being incorporated herein by reference, with such patent application being assigned to the assignee of the present invention. This application describes an improved form of planting apparatus which incorporates the basic features of the planting apparatus described in Canadian Pat. No. 985,753 but which, in addition, includes means thereby to adapt the apparatus for the planting of containerized seedlings, i.e. seedlings which have been grown at the nursery in individual small containers. The use of containerized seedlings provides numerous advantages which need not be described here.

The seedling planters described in the above-noted Canadian patent and in the patent application were particularly designed for use under Boreal forest conditions. These conditions include terrain which is often very rough with large rocks or boulders often being disposed a short distance below the soil surface. While this type of equipment has proven to be very satisfactory in rugged boreal forest conditions, there exists a need for a seedling planter of a somewhat more lightweight construction especially adapted for use under more moderate conditions. Planting sites of this nature include reclaimed agricultural lands, cut-over regions with chopped light slash with the terrain comprising relatively flat or long rolling surfaces. Moderate soil conditions include glacial till including small stones and gravel, sandy soils and moderately heavy clay loams.

SUMMARY OF THE INVENTION

In accordance with one aspect of the invention there is provided a seedling planting apparatus including a main frame and wheel support means for supporting the main frame above the ground. A pair of planting beams are each pivotally mounted adjacent to a respective one of the opposing sides of the frame, each planting beam having a planting dibble adjacent its free outer end. A pair of packing beams are each pivotally mounted to the main frame adjacent a respective one of the planting beams and have packing means at their free outer ends for pressing earth around the seedlings planted by the dibbles. An operators' station is disposed on the main frame intermediate the opposing sides of same so that, in use, the operators positioned at the operators' station have ready access to the planting dibbles in their raised position for placement of individual seedlings thereinto. Means are provided for raising and lowering the planting beams to cause the dibbles to move between raised seedling-receiving positions and lowered earth-penetrating positions. Ejecting means are carried by the respective planting beams for ejecting the seedlings out of their planting dibbles into furrows in the soil cut by the dibbles.

In the preferred arrangement the wheel support means comprises a pair of elongated walking beams each pivotally mounted adjacent to a respective one of the opposing sides of the main frame. A ground engaging wheel is attached to the free outer ends of each walking beams. A pair of module bases are provided, each connected to the main frame adjacent respective ones of the opposing sides of the frame. One each of the walking beams, planting beams and packing beams are pivotally connected to a respective one of each of the module bases.

As noted previously, the module bases are preferably laterally adjustable relative to the main frame thereby to readily enable the distances between the walking, planting and packing beams to be adjusted.

In a preferred form of the invention, the frontal portion of the frame is relatively wide and is provided with laterally extending oppositely projecting portions. The module bases are each mounted to an associated one of the wing portions with their associated walking, planting and packing beams extending rearwardly therefrom in flanking relation to the rear portion of the frame. The operators' station is located on the rear portion of the frame intermediate the opposed sets of beams. As described in more detail hereinafter the operators' station includes suitable seat means to accommodate the operator with the operators' station also including a protective cab partially enclosing the seat to protect the operators from injury.

As a further separate aspect of the invention a seedling planting apparatus includes a planting beam having a planting dibble connected to a free end of same, with means for moving the planting dibble between a raised seedling-receiving position and a lowered earth-penetrating and cutting position. The dibble is provided with means for holding the seedling placed therein as well as ground contacting means movable relative to the planting beam by a distance proportional to the depth of penetration of the dibble. Dislodging means are mounted for movement relative to the dibble for contacting the seedling and pushing it out of the dibble and means are provided operatively connecting the ground contacting means with the dislodging means. These means comprise spring-loaded means adapted to store spring energy as the ground contacting means are moved in response to penetration of the dibble into the earth and to release such spring energy to dislodge the seedling into the cut after the dibble has penetrated the earth to a predetermined depth.

The above-noted spring-loaded means preferably comprises a toggle mechanism having an over-center action with movement of the ground contacting means causing movement of the toggle position from a home position toward the center position during which spring energy is stored. The spring energy is released after the dead center position to propel the dislodging means and a seedling contacted thereby in a direction outwardly of the dibble.

In a preferred form of the invention the planting beam is pivotally attached to the main frame of the planter for movement in an arcuate path while the ground contacting means is pivotally mounted to the planting beam. The above-noted toggle mechanism typically includes a toggle spring and a rigid arm means rotatably mounted to the beam for movement in an arcuate path. A first one of the arm means is operatively connected to the dislodging means while a second one of the arm means is operatively connected to the toggle spring. A third one of the arm means is adapted to be contacted by the ground contacting means to effect the movement of the toggle mechanism.

In the preferred embodiment the toggle mechanism is arranged to interact with the dislodging means such that the latter is initially moved at a rate proportional to the rate of penetration of the dibble into the ground and, after the dead center position, the toggle mechanism causes the dislodging means to be moved in the same direction at a much higher rate of speed. Therefore, a two-speed operation is provided with the dislodging means coming into contact with the seedling relatively slowly and thereafter rapidly ejecting the tree. This reduces the damage which would otherwise occur if the seedling were impacted rapidly by the dislodging device.

The above-described planting dibble and seedling dislodging or ejecting system does not require the use of hydraulic systems or electrical systems and thus it can be constructed in a very economical manner to provide a structure which is reliable and trouble-free in operation.

In a typical operation the seedling planter described is towed behind a crawler tractor at an average speed of about one mile per hour (1.6 km/hr). The crawler tractor provides the hydraulic power to activate the planting beams etc. It is estimated that a seedling spacing of close to six feet will be provided at a cycle time of about four seconds. This provides a theoretical maximum of about 900 trees/hour/planting dibble. This four second cycle includes the time for manually loading the seedling into the planting dibble.

The crawler tractor is typically provided with a twin-row plough arrangement which clears away slash and debris from the region in which the seedlings are to be planted.

BRIEF DESCRIPTION OF THE VIEWS OF DRAWINGS

A typical embodiment of the invention will now be described, reference being had to the accompanying drawings in which:

FIG. 5 is a side elevation view of a planting beam, planting dibble and seedling ejection assembly;

FIG. 6 is a plan view of the structure shown in FIG. 5;

DETAILED DESCRIPTION OF PREFERRED EMBODIMENT

Figure 1:
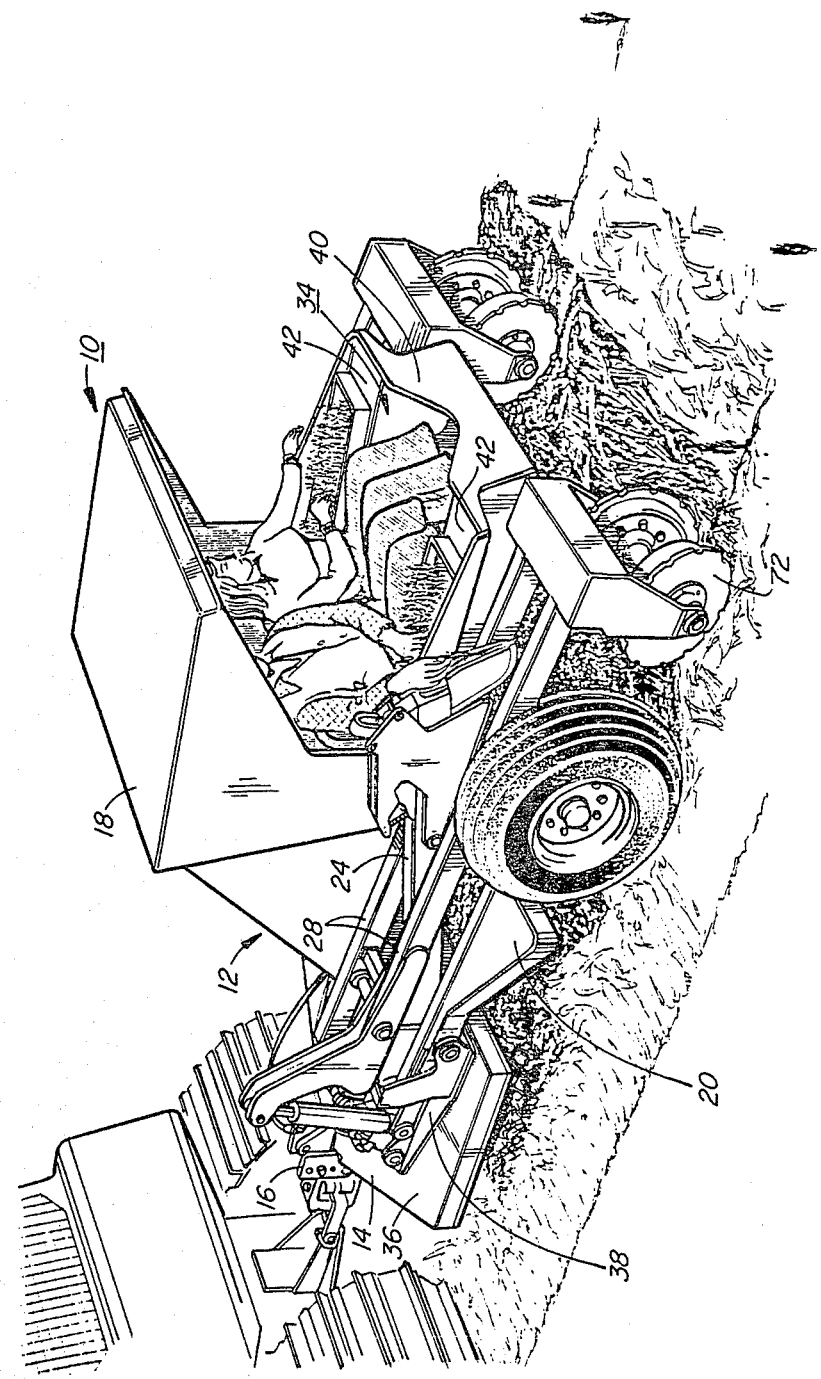
FIG. 1 is a perspective view of the seedling planter while in use and being towed along behind a crawler tractor.

The tree planter shown in the drawings is a trailer-type double dibble two-row tree planter, relying on the prime mover, i.e. the crawler tractor, for hydraulic power. The planter is of the intermittent furrow-type and is able to plant bare root seedlings and, with container attachments on the planting dibbles, to plant most common containers and plugs. The two laterally spaced apart planting beams and associated dibbles are operated independently by two operators on the planter facing the rear of the apparatus.

The planting apparatus 10 includes a frame generally indicated at 12 having a forward end 14 which includes a towing tongue 16 adapted to be connected to a bulldozer. The bulldozer is typically outfitted with a suitable twin-row plough to clear slash and debris from the rows in which the seedlings are to be planted. Frame 12 of the planter comprises a main frame proper and a cab enclosure 18 both of which are fabricated from welded steel components all sized and arranged to provide the necessary strength and rigidity as to withstand the rugged conditions encountered during use.

Referring more particularly to FIGS. 1 through 4, the wheel support system for supporting the main frame 12 above the ground includes a pair of elongated walking beams 20 each pivotally mounted via pivot axle 22 adjacent to a respective one of the opposing sides of the main frame. A pair of elongated planting beams 24 are also each pivotally mounted adjacent to a respective one of the opposing sides of the main frame via the above-noted pivot axles 22. Each planting beam 24 has a planting dibble 26 connected adjacent its free outer end. A pair of elongated packing beams 28 are also each pivotally mounted via pivot axles 30 adjacent a respective one of the planting beams. Each packing beam 28 has packing wheels 72 connected at its free outer end for packing earth around seedlings planted by the dibbles. Each packing beam comprises two main sections disposed in flanking relation to the associated planting beam 24.

An operators' station is disposed on the main frame intermediate the opposing sides of same in such location that, in use, the operators located at such operators' station have ready access to the planting dibbles 26 in their raised positions thereby to permit manual placement of the seedlings into the dibbles.

Referring again to the main frame 12, it will be seen that the frontal portion 14 of same is relatively wide and includes laterally extending oppositely projecting wing portions 36. A pair of module bases 38 are provided, each being attached to a respective one of the frame wing portions 36 and it will be readily seen from the drawings that one each of said walking beams 20, planting beams 24 and packing beams 28 are pivotally connected to a respective one of the module bases. Thus, the walking, planting and packing beams extend rearwardly from their associated module bases 38 in flanking relation to the relatively narrow rear portion of the main frame 12.

It will readily be seen from the drawings that the above-noted operators' station 34 is located on the rear portion 40 of the main frame intermediate the opposed sets of walking, planting and packing beams 20, 24 and 28 respectively. The operators' station conveniently includes a transversely arranged seat for accommodating a pair of operators, who sit facing the rear portion of the apparatus, each operator being located generally adjacent to the raised, seedling receiving position of a respective one of the planting dibbles 26. The above-noted operators' protective cab 18 substantially encloses the seat but is open at the rear and is partly open at the sides thereby to provide the operators with sufficient access to the planting dibbles in the raised positions of same. As best seen in FIG. 1 the operators' station includes a pair of opposed shelves 42 for placement thereon of cartons of seedlings to be planted in convenient positions adjacent the two operators.

Now that the general layout of the seedling planter has been described, reference will now be had to some of the more significant details of construction.

It was previously noted that the wheel support means for the main frame includes a pair of walking beams 20 pivotally mounted via pivot axles 22 to the main frame via the associated module base 38. The pivot axle 22 is mounted on a support bracket 46, the latter being welded to module base 38 with bracket 46 having a stop pad 48 connected to its upper end. In similar fashion each planting beam 24 is pivotally mounted via its associated pivot axle 30 on a support bracket 50, the latter being welded to its associated module base 38. The inner end portion of each packing beam 28 is provided with an upstanding lug 52, and a hydraulic actuator 54 is interconnected between the upper end of such lug 52 and the innermost end portion 56 of the associated walking beam 20 via suitable pivot axles. Thus there are two such hydraulic actuators 54, one adjacent each of the opposing sides of the planting apparatus. It will readily be seen from FIG. 2 that the hydraulic actuators 54 are operable in a first phase to lift the packing beams 28 upwardly to a raised position and, in a second phase, to move the walking beams 20 such as to pivot them downwardly thereby raising the main frame 12 upwardly to increase the amount of ground clearance. This is accomplished by virtue of the fact that the packing beams 28 are relatively light as compared with the main frame and its associated equipment. Thus, when the hydraulic actuators 54 are activated, the packing beams are rotated upwardly until the inner end portions of same come into contact with the aforementioned stop pads 48 located on the support brackets 46. These stop pads 48 then provide reaction points for the hydraulic actuators 54 with the latter then applying lifting forces to the innermost end portions of the walking beams 20 thus causing them to be pivoted about their respective pivot axles 22 thereby to provide increased ground clearance.

It was previously noted that the planting beams 24 are pivotally mounted adjacent opposing sides of main frame 12 via the above-noted pivot axles 22, the planting arms 28 extending rearwardly from their associated pivot axles and with the frontal end portions of each being provided with upstanding lugs 60. A hydraulic actuator 62 is interconnected between the upper end of each such lug 60 and a bracket 64 welded to the associated module base 38. Thus, as hydraulic actuators 62 are activated, the planting beams 24 are caused to pivot upwardly and downwardly in spaced apart planes parallel to the longitudinal axis of the planter.

Figure 4:
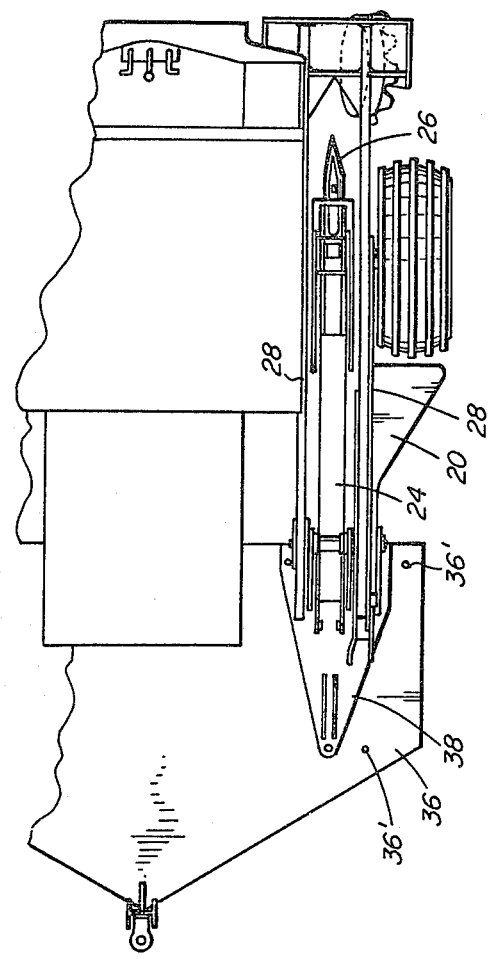
FIG. 4 is a partial plan view of the planter.

Since the walking, planting and packing beams together with their pivot support structures as well as the hydraulic actuators associated with same are all connected to an associated one of the module bases 38, it will be appreciated that the distances between these assemblies may easily be changed by disconnecting the module bases 38 from the main frame and shifting them inwardly or outwardly on the wing portions 36 of the main frame. For this purpose additional mounting apertures 36' may be provided in the wing portions as best illustrated in FIG. 4. This modular arrangement serves to save a great deal of time when it is desired to effect adjustments to the distance between the planting rows as well as during certain maintenance procedures.

Figure 3:
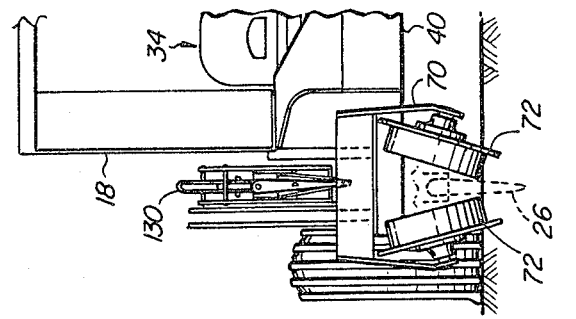
FIG. 3 is a partial end elevation view of the planter, it being realized that the planter is symmetrical about its longitudinal center line.
Figure 2:
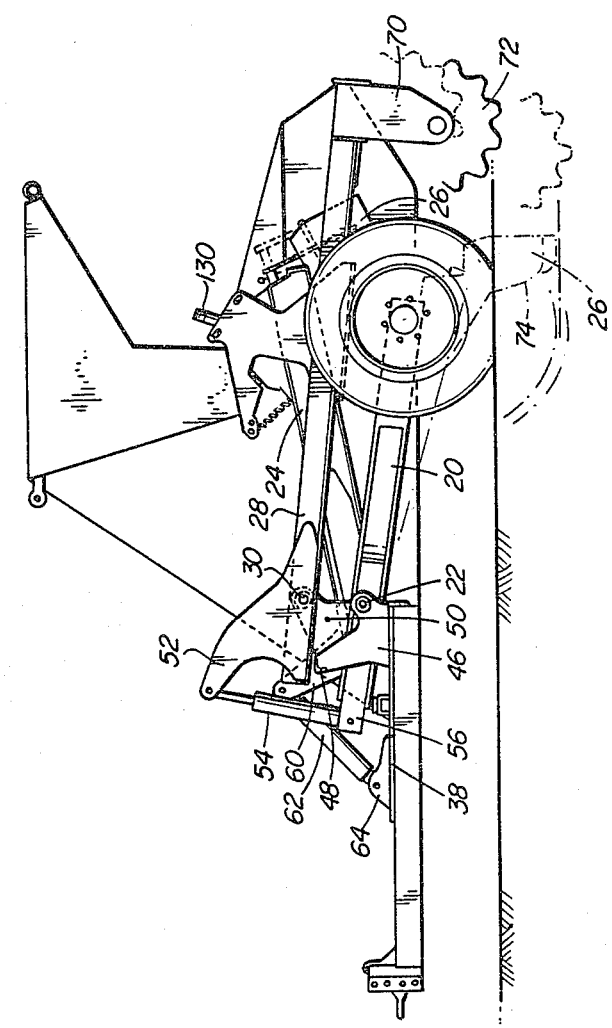
FIG. 2 is a side elevation view of the seedling planter.

Referring again to the packing beams 28, it will be noted that each packing beam 28 is provided at its free outer end with a spaced apart pair of downwardly extending arms 70 with the lower ends of such arms each being connected to an associated rotary packing wheel 72. As best seen in FIGS. 2 and 3, the packing wheels 72, in their lowered positions, are arranged to contact the ground closely adjacent the rear of the planting beam 24, such packing wheels 72 being towed inwardly as best seen in FIG. 3 thereby to enhance their capability to close the cut or furrow cut by the planting dibble and to tamp the earth around and against the planted seedling. Packing wheel 72 is shown as equipped with a toothed side plate to facilitate turning of the packing wheels during the planting operation.

It is noted here that hydraulic actuator 54 is placed on "float" position, during the planting operation. Weights may be located on arms 70 to vary the pressure on the soil. If the proper weights are used, depending upon the type of soil, and if the control lever is in the "float" position, the slit in the ground and the seedling will be satisfactorily compacted.

Figure 7:
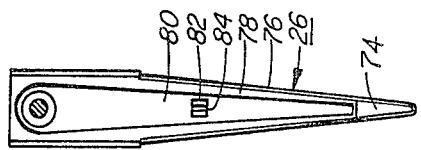
FIG. 7 is a rear elevation view of the planting dibble only.

The planting dibble 26 connected to the free outer end of each planting beam 24 is adapted to cut into the ground when such dibble is urged toward it by means of the hydraulic actuators 62. Generally speaking, each dibble 26 is of a sturdy welded construction including a relatively sharp leading and bottom edge-defining spine 74 to allow the dibble to slice more readily into the ground. The dibble also includes a pair of upright but spaced apart side walls 76 which diverge away from one another slightly in the upward direction as best seen in FIG. 7. These side walls 76 extend generally rearwardly of the spine of the dibble 26 and are securely welded thereto along their forwardly disposed edges as well as along their bottom edges. Thus, the spine of the dibble together with the spaced apart side walls 76 define a "pocket" which is open at the rear and at the top, such pocket being designated by reference 78. Extending downwardly into pocket 78 to a point closely adjacent the bottom of the pocket is an elongated ejector tongue 80. The ejector tongue 80 is in the form of a flat plate which tapers downwardly in width toward its lower end thereby to allow it to move freely to and fro between the dibble side walls 76. The ejector tongue moves in a straight line path of travel between the forwardly disposed position illustrated in full lines in FIG. 5 and the rearwardmost position illustrated in dashed lines. In the rearwardmost position of the ejector tongue, its rearward surface is disposed just slightly inwardly of the rearwardly disposed terminal edges of side walls 76.

Each dibble 26 includes means for holding the seedling manually positioned therein by one of the operators. Such means may take the form of fingers substantially as described in U.S. Pat. No. 3,931,774 issued Jan. 13th, 1976 to Bradley. These elongated fingers are designated by a reference number 82 and they extend rearwardly within the pocket 78 from the frontal wall of same to a point just rearwardly of the vertically disposed terminal edges of side walls 76. These fingers 82 extend through a small rectangular window 84 formed in the above-described ejector tongue 80. Thus, with the ejector tongue 80 in the forwardmost position, the seedling may be positioned by the operator between the fingers 82 and, after the dibble has moved downwardly and has penetrated into the earth the desired distance, the ejector tongue 80 is moved rearwardly thereby sweeping the seedling clear of the fingers 82 and into the cut or furrow made by the dibble. As the ejector tongue 80 moves rearwardly it applies forces to the seedling substantially all along its length thus ensuring that the seedling is maintained in a generally upright position as it is moved into the cut made by the dibble.

The planting apparatus described herein includes a ground contacting means movable relative to the planting beam 24 by a distance proportional to the depth of penetration of the dibble. A mechanical spring loaded system is operatively interconnected between the ground contacting means and the seedling dislodging means (including ejector tongue 80) which spring loaded means is adapted to store spring energy as the ground contacting means is moved in response to penetration of the dibble into the earth and to release such spring energy to cause the ejector tongue 80 to move outwardly and dislodge the seedling into the cut after the dibble has penetrated the earth to the desired depth.

The above-noted ground contacting means, as best seen in FIGS. 5 and 6, comprises a trigger plate 90 which is of generally U-shaped configuration when seen in cross-section, this trigger plate being arranged in generally embracing relationship with the rear end portion of planting beam 24 and being pivoted adjacent its forward end to the planting beam 24 by means of pivot axle 92. The ground contacting surface 94 of trigger plate 90 extends rearwardly along and just below the lower surface of planting beam 24 with the rearward end of surface 94 being located just forwardly of the frontal portion of dibble 26. A spring 96 interacting between the upper surface of planting beam 24 and ear portions 98 formed on trigger plate 90 tends to bias the trigger plate 90 in the clockwise direction as shown in FIG. 5 thus assisting gravity in urging the trigger plate 90 to the down or home position. When the planting beam 24 is urged downwardly and the dibble 26 cuts into the ground, the surface 94 of trigger plate 90 comes into contact with the ground and it is urged against the biasing spring 96 in the counterclockwise direction. As the trigger plate 90 is thus being gradually rotated in the counterclockwise direction as shown in FIG. 5, spring energy is gradually stored in the seedling dislodging mechanism following which ejection of the seedling from the dibble takes place. The mechanism for accomplishing this action will be described with particular reference to FIG. 8.

Figure 8:
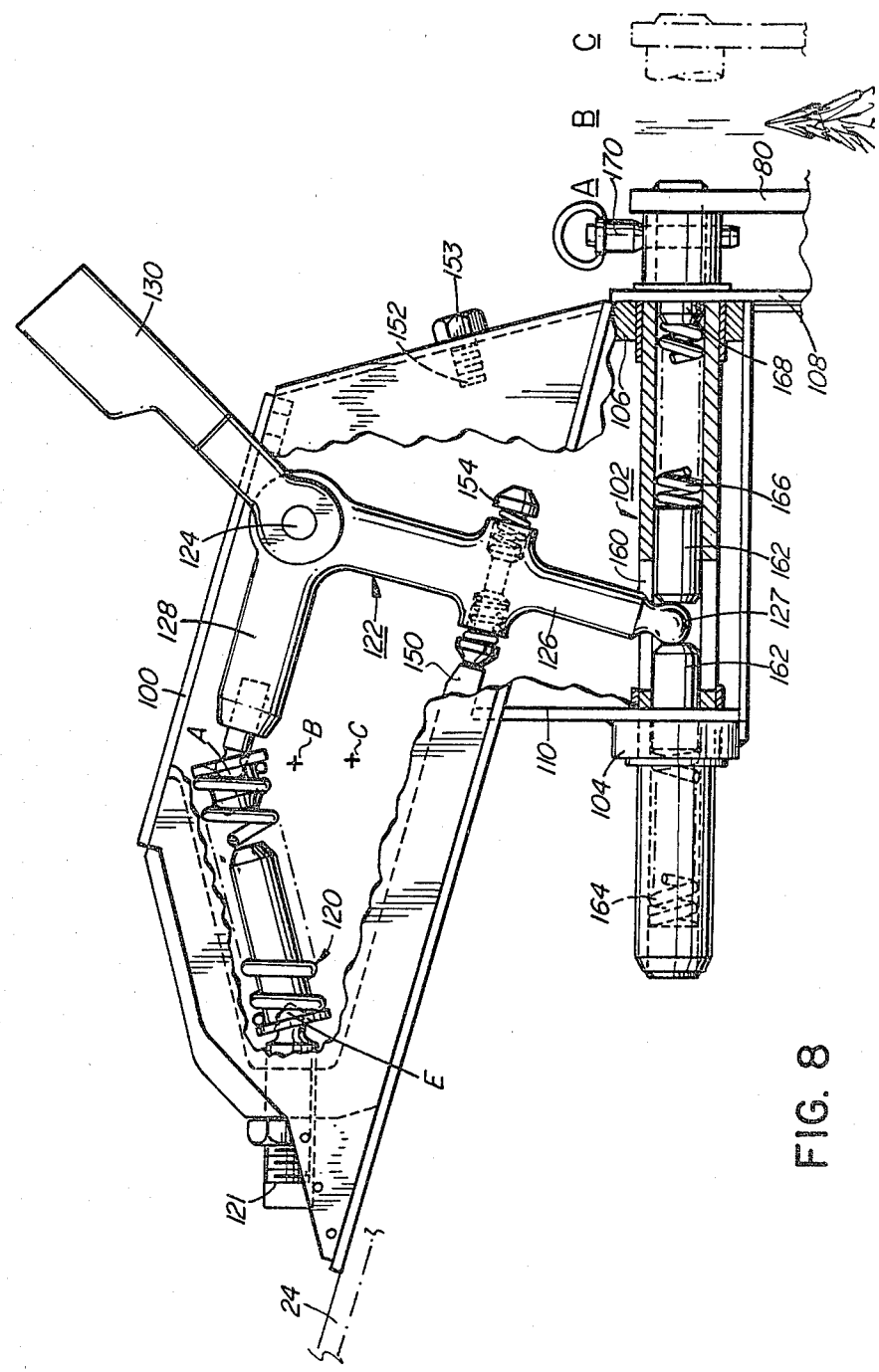
FIG. 8 is a side elevation view of the spring loaded system for dislodging or ejecting individual seedlings into the cut in the earth formed by the planting dibble.

Referring to FIG. 8, it will be seen that the rear end portion of the planting beam 24 is provided with a housing 100 disposed on the upper surface of same. The side wall of this housing has been partially cut away in FIG. 8 to show the mechanism contained within same and furthermore the planting beam proper is shown in phantom thereby to illustrate the structures disposed in the rear portion of same.

It will be noted firstly that the ejector tongue 80 is secured at right angles to an elongated ejector shaft 102 which is slidably disposed for rectilinear motion in bushings 104 and 106, bushing 106 being secured to the rear end wall 108 of planting beam 24 while the other bushing 104 is securely mounted to plate 110 disposed within the planting beam. The ejector shaft 102 is thus movable endwise within bushings 104 and 106 thereby to move ejector tongue 80 between positions A and C as illustrated in FIG. 8.

The spring loaded means for activating the ejector tongue comprises a toggle mechanism and is seen in FIG. 8 and this includes a toggle spring assembly 120 which interacts with a rigid toggle arm assembly 122. The toggle arm assembly 122 is mounted to housing 100 via pivot shaft 124 for limited angular movement relative to planting beam 24. Toggle arm assembly 122 includes a plurality of arms radiating outwardly from same. A first one of these arms 126 is operatively connected to ejector shaft 102. A second arm 128 is operatively connected to toggle spring assembly 120 while a third arm 130 is adapted to be contacted by trigger plate 90 as the latter rotates about its pivot axle 92. It will be seen that the third arm 130 is located entirely outside of housing 100. The third arm 130 is generally U-shaped and has its lower opposing ends rigidly connected to the outer ends of pivot shaft 124. The previously described generally U-shaped trigger plate 90 includes spaced parallel web portions 134 which are arranged in flanking relation to the third arm 130. These web portions 134 are each provided with a pair of opposed elongated slots 136 with elongated contact pins 138 and 140 being disposed within and spanning between the opposed pairs of slots. An opposed pair of coil tension springs 142 urges pins 138 and 140 toward one another. Referring to FIGS. 5 and 7 it will be seen that these contact pins 138, 140 are disposed on opposing sides of the third arm 130. Hence, as the trigger plate 90 is rotated in the counterclockwise direction, pin 140 contacts the third arm 130 causing rotation of toggle arm assembly 122 in the counterclockwise direction. As this action occurs, the end of toggle spring assembly 120 moves from point A toward point B. Point B is in a direct line between the axis defined by pivot axle 124 and a point E of pivotal movement of toggle spring assembly relative to housing 100. During the time that movement from point A to point B occurs, the toggle spring assembly is being compressed thus storing spring energy. However, after point B is reached, an over-centering action occurs with the result being that the spring energy is released during travel from point B to point C. Thus a fairly rapid snap action takes place between points B and C. As this action is occurring, the first arm 126 is being moved in the same manner thus causing endwise movement of the ejector shaft 102 relative to its bushings 104 and 106. Ejector shaft 102 and the attached ejector tongue 80 thus move from point A to point B at a rate proportional to the rate of penetration of the dibble 26 into the ground. During this relatively slow movement the ejector tongue, in operation, comes into contact with the seedling supported by the fingers 82. Then, after point B is reached, a fairly rapid snap action occurs as the spring energy in the toggle mechanism is released thus causing the ejector tongue 80 to move rapidly to point C. It will thus be seen that the mechanism described above provides a two-speed action. Relatively slow movement of the ejector tongue from point A to point B is provided during which time the ejector tongue comes into contact with the seedling followed by a relatively fast ejecting action between points B and C. This action reduces the amount of damage which would otherwise occur to the seedling if the latter were impacted rapidly with the ejector tongue.

After the seedling has been planted in the cut made by the dibble, the planting beam 24 is swung up by its hydraulic actuator with the result being that trigger plate 90 rotates clockwise relative to the planting beam with pin 138 coming into contact with the third arm 130 thus resetting the mechanism and allowing the operator to position a further seedling between the fingers 82.

In order to avoid shock and impact forces on the various components, numerous shock absorbing springs and the like are employed in the mechanism. It has already been noted that contact pins 138 and 140 are biased towards one another by coil tension springs 142. These coil tension springs allow contact pins 138, 140 to move in their associated slots 136 thus reducing the impact forces between the third arm 130 and such contact pins.

In order to cushion the first arm as it moves between stop points 150 and 152, such first arm 126 is provided with an axially movable plunger arrangement 154 comprising a shaft movable transversely relative to first arm 126, such shaft being equipped with oppositely disposed biasing springs. This arrangement absorbs shock at both ends of the angular motion of the toggle arm assembly, i.e. as it moves between stop points 150 and 152.

The ejector shaft is also designed so as to take up shock and impact forces. It will be seen that the ejector shaft 102 is hollow with the first arm 126 entering into ejector shaft 102 via one of an opposed pair of slots 160 disposed in such shaft. The arcuate end portion 127 of first arm 126 is disposed between an opposed pair of plungers 162 slidably disposed within ejector shaft 102. These plungers 162 are urged into contacting relationship with head portion 127 of first arm 126 by means of opposed compression springs 164 and 166 also located within shaft 102. Spring 164 seats within the inner end portion of ejector shaft 102 while the other compression spring 166 seats against a short stem portion 168, the outer end of which is securely welded to the upper end of ejector tongue 80. A disconnect pin 170 extends through aligned bores in the outer end of ejector shaft 102 and stem portion 168 thus releasably connecting ejector tongue 80 to the ejector shaft. Those skilled in the art will readily appreciate that the opposed compression springs 164, 166 provide resiliency and reduce shock both during rejection and retraction as well as preventing breakage in case debris interferes with the mechanism and causes it to hang up.

Various adjustments can be made to the mechanism to enhance its operation. The amount of spring force exerted by the toggle spring assembly 120 can be varied by rotating adjustment screw 121 thereby to vary the amount of pre-loading on the toggle spring. The degree of angular movement of the toggle arm assembly 122 can be adjusted within limits by changing the location of stop point 152 by rotation of adjusting studs 153. In addition, the depth to which the seedlings are planted can be varied by providing an auxiliary plate 91 (shown in dashed lines) which attaches below the lower surface 94 of the trigger plate. Several such auxiliary plates 94 can be provided and, when one wishes to change the planting depth, it is a simple matter to remove one plate and replace it with another. Differing planting depths, as is well known in the art, are used for different planting conditions and different types of plant stock.

The operation of the apparatus will be readily apparent from the description given above. As the seedling planter is drawn along the planting row by the crawler tractor, the operators, by means of a suitably positioned foot valve, (not shown), control the hydraulic actuators 62 which swing the planting beams 24 upwardly and downwardly. With the planting beam 24 in the upper position, the ejector tongue 80 is in the retracted position. The operator then quickly places an individual seedling between the fingers 82 following which the actuator 62 is activated to swing planting beam 24 downwardly thus causing dibble 26 to penetrate into the soil. As this action occurs the trigger plate 90 is rotated thus causing pin 136 to come into contact with the third arm 130 of the toggle arm assembly. Continued movement of the trigger plate causes spring energy to be stored in the toggle spring assembly until the overcentering action occurs with the result being that the ejector tongue 80 is propelled outwardly thus dislodging the seedling from fingers 82 and moving it into the cut on the ground made by the dibble. As soon as this action occurs the operator activates the hydraulic actuator to swing beam 24 upwardly with the result being that under the influence of gravity and return spring 96, trigger plate 90 rotates clockwise relative to planting beam 24 thus resetting the toggle arm assembly 122 to the home position and retracting ejector tongue 80 following which the operator places a further seedling between fingers 82. The packing wheels 72 are in contact with the ground at all times during this procedure and they serve to pack the earth around the planted seedlings in the usual manner. The above-described operations continue until the end of the planting row is reached at which time the operators will activate hydraulic cylinders 54 thereby to cause the packing beams 28 to be swung upwardly until they reach the stops defined by stop pads 48 following which these same cylinders 54 serve to cause the walking beams 20, to which the wheels are attached, to pivot downwardly thus raising the main frame 12 upwardly to provide additional ground clearance. The operator then turns the seedling planter around in any desired manner and the seedling planter is then placed in readiness for a further planting operation.

While a specific embodiment of the invention has been described for purposes of illustration, those skilled in the art will realize that numerous modifications may be made to the details of construction while still remaining within the spirit or scope of the invention as defined in the appended claims.

I claim:

1. Apparatus for planting seedlings comprising a main frame; wheel support means for supporting the main frame above the ground; a pair of planting beams each pivotally mounted adjacent to a respective one of the opposing sides of the main frame, each planting beam having a planting dibble adjacent its free outer end; a pair of packing beams each pivotally mounted to the main frame adjacent a respective one of said planting beams and having packing means at their free outer ends for packing earth around seedlings planted by said dibbles, an operators' station disposed on said main frame intermediate the opposing sides of the main frame whereby, in use, operators located at the operators' station have access to the planting dibbles in their raised positions for placement of seedlings thereinto, means for raising and lowering said planting beams to cause the dibbles carried thereby to move between raised seedling-receiving positions and lowered earth-penetrating positions; and ejecting means carried by the respective planting beams for ejecting individual seedlings out of their planting dibbles into furrows in the soil cut thereby, and wherein said wheel support means comprises a pair of elongated walking beams each pivotally mounted adjacent to a respective one of the opposing sides of the main frame, a ground engaging wheel attached to a free outer end portion of each said walking beams, a pair of module bases, each connected to the main frame adjacent a respective one of the opposing sides thereof; one each of said walking beams, planting beams and packing means being pivotally connected to a respective one of said module bases.

2. The apparatus of claim 1 wherein said module bases are laterally adjustable relative to said main frame to vary the distances between the walking, planting, and packing beams on the one side of said main frame and those on the other side.

3. Apparatus according to claim 1 wherein said main frame includes a frontal portion and a rear portion, the frontal portion being relatively wide, with laterally extending oppositely projecting wing portions, said module bases each being mounted to a respective one of said wing portions with their associated walking, planting and packing beams extending rearwardly therefrom in flanking relation to said rear portion of said frame.

4. Apparatus according to claim 3 wherein said operators' station is located on said rear portion of the frame intermediate the opposed sets of walking, planting and packing beams.

5. Apparatus according to claim 4 wherein said operators station includes seat means to accommodate a pair of operators, each adjacent to the raised seedling receiving position of a respective one of the planting dibbles.

6. Apparatus according to claim 5 wherein said operators station further includes a protective cab enclosing said seat means but open at least at the sides so that the operators have access to the planting dibbles in said raised positions thereof.

7. Apparatus according to claim 2 including force applying means operatively connected between said wheel support means and said packing beam and operable in a first phase to lift the packing beams to a raised position and, in a second phase, to move said wheel support means to raise said main frame to provide additional ground clearance after the packing beams have reached the raised position.

8. Apparatus for planting seedling comprising; a main frame adapted for movement over the ground, a planting beam movably attached to said frame and having a planting dibble connected to a free end thereof; actuator means for raising and lowering said planting beam to move said planting dibble between a raised seedling-receiving position and a lowered earth penetrating and cutting position, means in said dibble for holding a seedling placed therein; ground contacting means movable relative to the planting beam by a distance proportional to the depth of penetration of the dibble, dislodging means mounted for movement relative to the dibble for contacting the seedling and pushing it out of the dibble, and means operatively connecting said ground contacting means with said dislodging means including spring loaded means adapted to store spring energy as said ground contacting means is moved in response to penetration of the dibble into the earth and to release such spring energy to dislodge the seedling into the cut after the dibble has cut to a predetermined depth.

9. Apparatus according to claim 8 wherein said spring loaded means comprises a toggle mechanism having an over-center action, movement of said ground contacting means causing movement of the toggle mechanism from a home position toward the center position during which spring energy is stored, with the spring energy being released after the dead center position to propel said dislodging means and a seedling contact thereby in a direction outwardly of said dibble.

10. Apparatus according to claim 9 wherein said planting beam is pivotally attached to said frame for movement in an arcuate path and said ground contacting means is pivotally mounted to said planting beam, and said toggle mechanism includes a toggle spring and rigid arm means rotatably mounted to said beam for movement in an arcuate path, a first one of said arm means being operatively connected to said dislodging means; a second one of said arm means being operatively connected to said toggle spring, and a third one of said arm means adapted to be contacted by the ground contacting means to effect said movement of the toggle mechanism.

11. Apparatus according to claim 10 wherein said first one of said arm means is connected to said dislodging means via a spring means which absorbs shock and impact loadings.

12. Apparatus according to claim 11 wherein said dislodging means is mounted for movement in a generally linear path.

13. Apparatus according to claim 9, 10 or 11 wherein said toggle mechanism is arranged to interact with said dislodging means such that the latter is initially moved in a direction outwardly of the dibble at a rate proportional to the rate of penetration of the dibble into the ground and, after the dead center position, said toggle mechanism causing said dislodging means to be moved in the same direction at a much higher rate of speed.

14. Apparatus according to claim 9, 10 or 11 wherein said ground contacting means is adapted to return to an initial position as the dibble is withdrawn from the ground, said means operatively connecting said ground contacting means to said dislodging means including means acting on said toggle mechanism to return the latter to the home position as the ground contacting means returns to the initial position.

* * * * *